United States Patent
Kawamura et al.

(10) Patent No.: US 9,126,558 B2
(45) Date of Patent: Sep. 8, 2015

(54) HEAD-PROTECTING AIRBAG DEVICE

(71) Applicant: TOYODA GOSEI CO., LTD., Kiyosu-shi, Aichi-ken (JP)

(72) Inventors: Koji Kawamura, Kiyosu (JP); Wataru Miura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/183,770

(22) Filed: Feb. 19, 2014

(65) Prior Publication Data

US 2014/0239620 A1    Aug. 28, 2014

(30) Foreign Application Priority Data

Feb. 28, 2013   (JP) .................................. 2013-039154

(51) Int. Cl.
*B60R 21/232*   (2011.01)
*B60R 21/213*   (2011.01)
*B60R 21/231*   (2011.01)
*B60R 21/233*   (2006.01)

(52) U.S. Cl.
CPC ............. *B60R 21/213* (2013.01); *B60R 21/232* (2013.01); *B60R 2021/23192* (2013.01); *B60R 2021/23308* (2013.01)

(58) Field of Classification Search
CPC ............ B60R 21/232; B60R 2021/23308; B60R 2021/23316; B60R 2021/23324; B60R 2021/23192; B60R 21/213
USPC ....................................................... 280/730.2
See application file for complete search history.

(56) References Cited

U.S. PATENT DOCUMENTS

| | | | | |
|---|---|---|---|---|
| 5,865,462 | A * | 2/1999 | Robins et al. | 280/730.2 |
| 6,695,341 | B2 * | 2/2004 | Winarto et al. | 280/730.2 |
| 6,893,045 | B2 * | 5/2005 | Inoue et al. | 280/753 |
| 2003/0178831 | A1 * | 9/2003 | Roberts et al. | 280/743.1 |
| 2004/0119270 | A1 * | 6/2004 | Gu et al. | 280/730.2 |
| 2005/0184492 | A1 * | 8/2005 | Shilliday et al. | 280/730.2 |
| 2006/0214401 | A1 * | 9/2006 | Hirata | 280/730.1 |
| 2008/0012275 | A1 * | 1/2008 | Pinsenschaum et al. | 280/730.2 |
| 2009/0236829 | A1 * | 9/2009 | Tanaka et al. | 280/728.2 |
| 2010/0032930 | A1 * | 2/2010 | Yamamura et al. | 280/730.2 |
| 2010/0264630 | A1 * | 10/2010 | Walston | 280/730.2 |
| 2014/0042732 | A1 * | 2/2014 | Taguchi et al. | 280/729 |
| 2014/0217710 | A1 * | 8/2014 | Fukawatase et al. | 280/730.2 |
| 2014/0239621 | A1 * | 8/2014 | Kawamura et al. | 280/730.2 |

FOREIGN PATENT DOCUMENTS

| | | | |
|---|---|---|---|
| DE | 10050216 A1 * | 4/2002 | |
| EP | 2441627 A1 * | 4/2012 | |
| JP | 2012-214114 A | 11/2012 | |

* cited by examiner

*Primary Examiner* — James English
(74) *Attorney, Agent, or Firm* — Posz Law Group, PLC

(57) ABSTRACT

In a head-protecting airbag device, an airbag includes an inflatable curtain portion that is deployable over an inboard side of a window and an overlap inflatable portion that overlaps with an inboard side of the inflatable curtain portion at airbag deployment. The overlap inflatable portion is so configured as to complete inflation after the inflatable curtain portion has completed inflation. The overlap inflatable portion is deployable into a generally rod shape extending at a slant relative to an up and down direction and a first end of the overlap inflatable portion communicates with the inflatable curtain portion at a vicinity of an upper edge of the inflatable curtain portion as inflated whereas a second end of the overlap inflatable portion is jointed to a lower edge of the inflatable curtain portion away from the first end in an up and down direction.

13 Claims, 10 Drawing Sheets

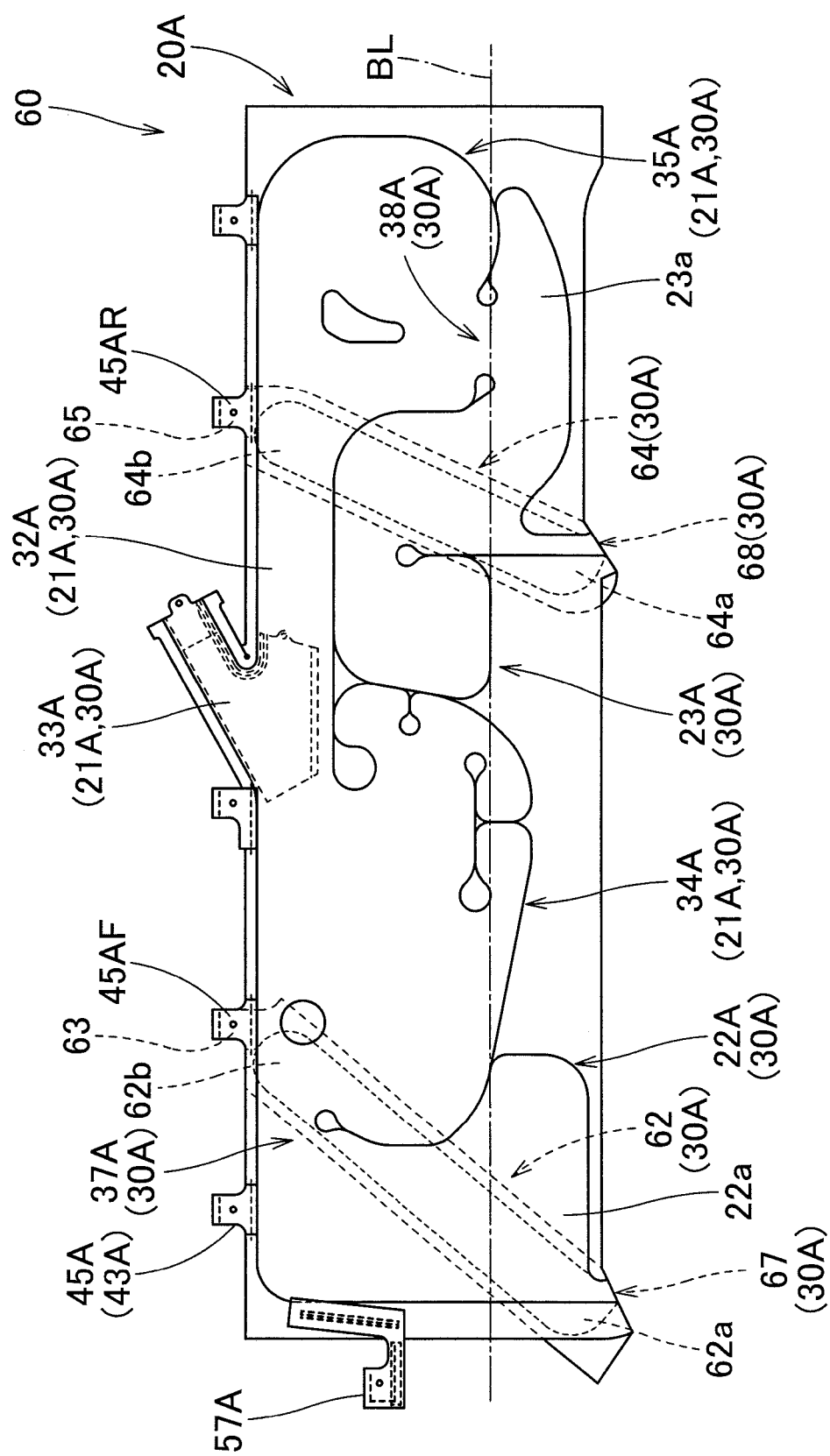

HEAD-PROTECTING AIRBAG DEVICE

CROSS REFERENCE TO RELATED APPLICATIONS

The Present application claims priority from Japanese Patent Application No. 2013-39154 of Kawamura et al., filed on Feb. 28, 2013, the disclosure of which is hereby incorporated into the present application by reference.

BACKGROUND OF THE INVENTION

1. Field of the Invention

The present invention relates to a head-protecting airbag device whose airbag is mountable on an upper periphery of a window of a vehicle in a folded-up configuration with an upper edge thereof secured to a vehicle body structure and is deployable downward over the window when fed with an inflation gas.

2. Description of Related Art

JP 2012-214114 A discloses a known head-protecting airbag device. In this head-protecting airbag device, an airbag includes a main chamber that is deployable over a window at an inboard side of a vehicle and a regulating portion that extends straightly rear- and upwardly inside the main chamber in order to regulate the thickness of the main chamber. The airbag further includes a sub chamber that has a rod-like shape. The sub chamber, which is arranged along the lower edge of the main chamber when the airbag is in a flattened state, is located on an outboard side of the regulating portion in an overlapping fashion, such that the thickness of the airbag is generally uniform as a whole when inflated.

In this known head-protecting device, the sub chamber is so arranged as to extend at a slant relative to an up and down direction on an outboard side of the main chamber. However, this sub chamber helps uniform the thickness of the airbag as a whole by covering an outboard side of the regulating portion which is formed by jointing two walls of the main chamber together, and does not help increase the thickness of the airbag as a whole. This configuration does not provide a sufficient arresting property in the event of a rollover crash of a vehicle. A rollover crash is not considered in this known head-protecting airbag devices, either.

SUMMARY OF THE INVENTION

The object of the present invention is to provide a head-protecting airbag device that is capable of preventing an occupant from moving toward an outside of a vehicle and arresting the occupant inside the vehicle, in the event of a rollover crash.

A head-protecting airbag device of the invention has an airbag that is mountable on an upper edge of a window on an inboard side of a vehicle in a folded-up configuration with an upper edge of the airbag secured to a vehicle body structure. The airbag is deployable downward over the window when fed with an inflation gas from an inflator. The airbag includes:

an inflatable curtain portion that is deployable over an inboard side of the window; and an overlap inflatable portion that is in gas communication with the inflatable curtain portion and is deployable on an inboard side or on an outboard side of the inflatable curtain portion in an inflated state in such a manner as to overlap with an inflated region of the inflatable curtain portion, the overlap inflatable portion being so configured as to complete inflation after the inflatable curtain portion has completed inflation, the overlap inflatable portion being inflatable into a generally rod shape extending at a slant relative to an up and down direction, and a first end of the overlap inflatable portion being in gas communication with the inflatable curtain portion at a vicinity of an upper edge or a lower edge of the inflatable curtain portion as inflated whereas a second end of the overlap inflatable portion being jointed to an opposite edge of the inflatable curtain portion in an up and down direction away from the first end.

In the head-protecting airbag device of the invention, the overlap inflatable portion is deployable on an inboard side or on an outboard side of the inflatable curtain portion in an overlapping fashion. The overlap inflatable portion as inflated is in the form of a generally rod extending at a slant relative to an up and down direction, and the opposite ends of the overlap inflatable portion are connected to the upper edge and lower edge of the inflatable curtain portion, respectively. This configuration will increase the thickness of the airbag effectively without increasing a volume of the airbag, since an inflated region of the inflatable curtain portion and an inflated region of the overlap inflatable portion overlap each other in an in- and outboard direction over a wide range in a front and rear direction and in an up and down direction. Moreover, the overlap inflatable portion is so configured as to complete inflation after the inflatable curtain portion has completes inflation. With this configuration, in the event of a side impact where an airbag is required to cushion a vehicle occupant at an early time point, mainly the inflatable curtain portion will cushion an occupant's head quickly, and in the event of a rollover crash which happens at a later time point compared with a side impact, mainly the overlap inflatable portion will cushion an occupant's head. That is, the head-protecting airbag device is capable of preventing an occupant's head from moving far toward an outside of a vehicle and arresting the occupant inside the vehicle, in the event of a rollover crash.

Therefore, the head-protecting airbag device of the invention is capable of preventing an occupant from moving toward an outside of a vehicle and arresting the occupant inside the vehicle, in the event of a rollover crash.

In the head-protecting airbag device of the invention, it is desired that:

in a flattened and unfolded state of an airbag constituting body for constituting the airbag, the overlap inflatable portion adjoins at an upper side or at a lower side of the inflatable curtain portion and extends generally in a front and rear direction; and the overlap inflatable portion communicates with the inflatable curtain portion via a communication portion provided at a front end or a rear end of the overlap inflatable portion, and the overlap inflatable portion is turned down at the communication portion over an inboard side or outboard side of the inflatable curtain portion.

This configuration will make it difficult for an inflation gas to move through between the inflatable curtain portion and overlap inflatable portion, and accordingly will delay the start of inflation of the overlap inflatable portion surely relative to the start of inflation of the inflatable curtain portion. Further, since the turned down portion serves as a check valve, an inflation gas having once flown into the overlap inflatable portion will be hindered from moving back to the inflatable curtain portion. This will help secure an enough internal pressure of the overlap inflatable portion at a rollover, and the overlap inflatable portion will arrest an occupant's head securely even if an internal pressure of the inflatable curtain portion has been reduced.

If a connection port of the airbag connected with the inflator for introducing an inflation gas into the inflatable curtain portion is integral with the inflatable curtain portion and protrudes upward from the center in a front and rear direction of the upper edge of the inflatable curtain portion, it is desired that the overlap inflatable portion is located at at least either one position in front of or at the rear of the connection port on the inflatable curtain portion in the airbag constituting body as flattened and unfolded. This configuration will provide a good yield of a base fabric for forming the airbag constituting body in comparison with an instance where the overlap inflatable portion is located under the inflatable curtain portion.

In the above head-protecting airbag device of the invention, it is further desired that:

the inflatable curtain portion includes a main inflatable portion and a sub inflatable portion that is in gas communication with the main inflatable portion via an upper reach communication portion and completes inflation after the main inflatable portion has completed inflation;

the overlap inflatable portion is in gas communication with the sub inflatable portion via a lower reach communication portion; and the lower reach communication portion has a smaller opening area than the upper reach communication portion.

The sub inflatable portion will help suppress an undue increase of internal pressure of the main inflatable portion by absorbing an extra inflation gas from the main inflatable portion when the main inflatable portion cushions an occupant's head in the event of a side impact, and the main inflatable portion will cushion the head with an adequate reaction force. Moreover, since the lower reach communication portion has a smaller opening area than the upper reach communication portion, an inflation gas having flown into the sub inflatable portion will be kept from flowing into the overlap inflatable portion immediately in the event of a side impact, and accordingly the start of inflation of the overlap inflatable portion will be surely delayed relative to the start of inflation of the sub inflatable portion.

Furthermore, in the above head-protecting airbag device, if the lower edge of the inflatable curtain portion is deployable below a beltline located at a lower edge of the window, the lower edge of the inflatable curtain portion will be supported at the outboard side by a door trim, which constitutes the beltline, upon a rollover of a vehicle, thus arresting and protecting an occupant's head properly.

BRIEF DESCRIPTION OF DRAWINGS

FIG. 10 is a front view of the airbag formed by turning down overlap inflatable portions in the airbag constituting body of FIG. 9, as flattened.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
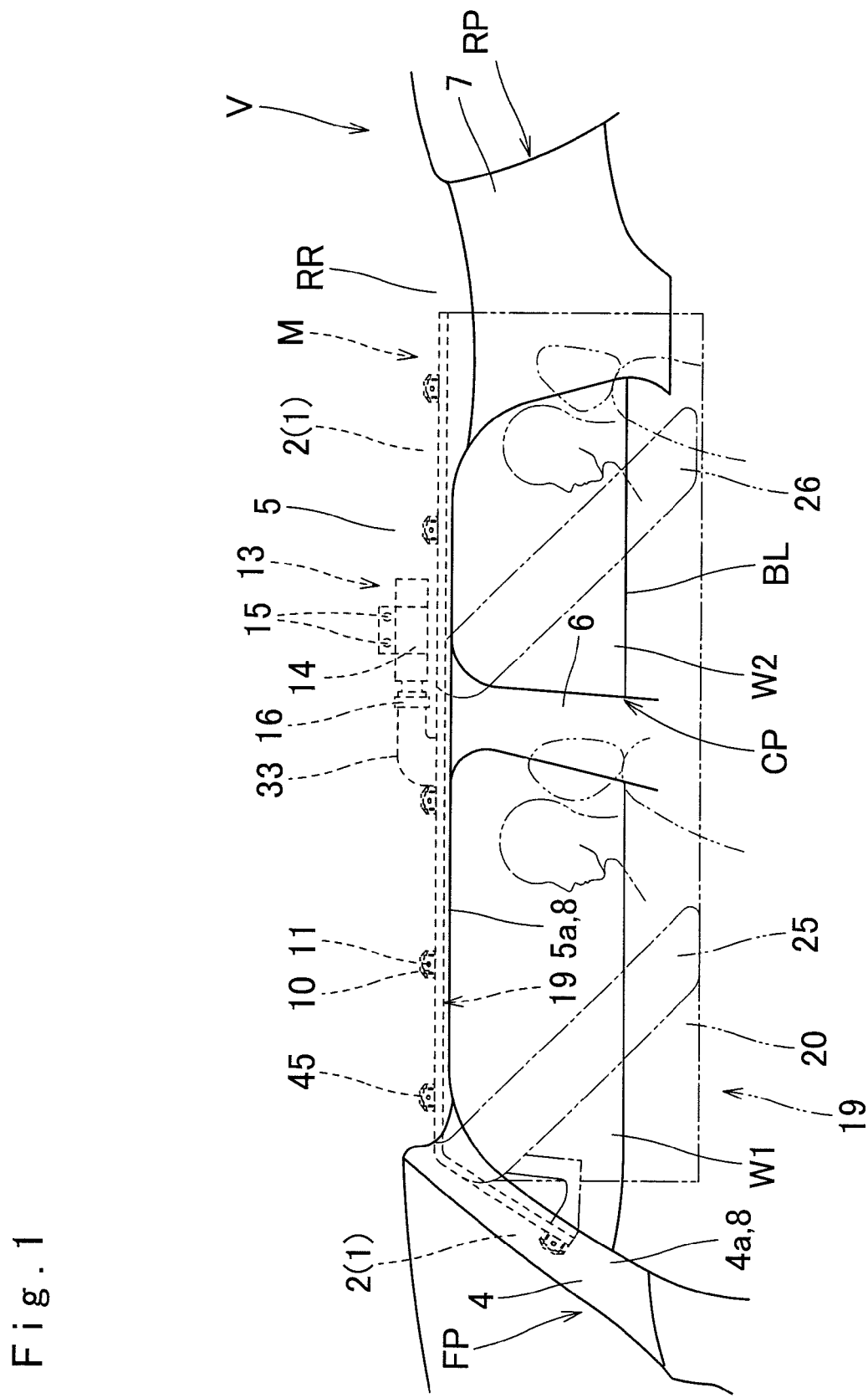
FIG. 1 is a schematic front view of a head-protecting airbag device embodying the present invention, as viewed from an inboard side.

As shown in FIG. 1, a head-protecting airbag device M embodying the present invention is mounted on a vehicle V with two side windows W1 and W2, i.e., with two rows of seats. The head-protecting airbag device M includes an airbag 19, an inflator 13, mounting brackets 10, a mounting bracket 14, and an airbag cover 8. The airbag 19 is housed on upper peripheries of the windows W1 and W2 on the inboard side of the vehicle V in an folded-up configuration, specifically from the lower periphery of a front pillar FP through the region above a rear pillar RP, via the lower periphery of a roof side rail RR.

As shown in FIG. 1, the airbag cover 8 is constructed of a lower hem 4*a* of a front pillar garnish 4 arranged on the front pillar FP, and a lower hem 5*a* of a roof head liner 5 arranged on the roof side rail RR. The front pillar garnish 4 and roof head liner 5 are fabricated of synthetic resin and secured to an inner panel 2 of the vehicle body structure 1 at the front pillar FP and roof side rail RR. The airbag cover 8 covers the inboard side of the airbag 19 and is openable toward an interior I of the vehicle when pushed by the airbag 19 under inflation for allowing airbag deployment.

As shown in FIG. 1, the inflator 13 is substantially columnar in shape and includes at the leading end gas discharge ports (unillustrated) for feeding an inflation gas into the airbag 19. The inflator 13 is coupled to the airbag 19 by the leading end region having the gas discharge ports and inserted into a later-described connection port 33 of the airbag 19. A clamp 16 is mounted around the rear end 33*a* of the connection port 33 to clamp the connection port 33 onto the leading end region of the inflator 13. The inflator 13 is secured to the inner panel 2 above the window W2 by a mounting bracket 14 mounted around the inflator 13 and mounting bolts 15. The inflator 13 is electrically connected with an unillustrated control of the vehicle V via an unillustrated lead wire, and is so designed as to be actuated in response to an actuating signal fed from the control that has detected a side impact or a rollover of the vehicle V.

Figure 6:
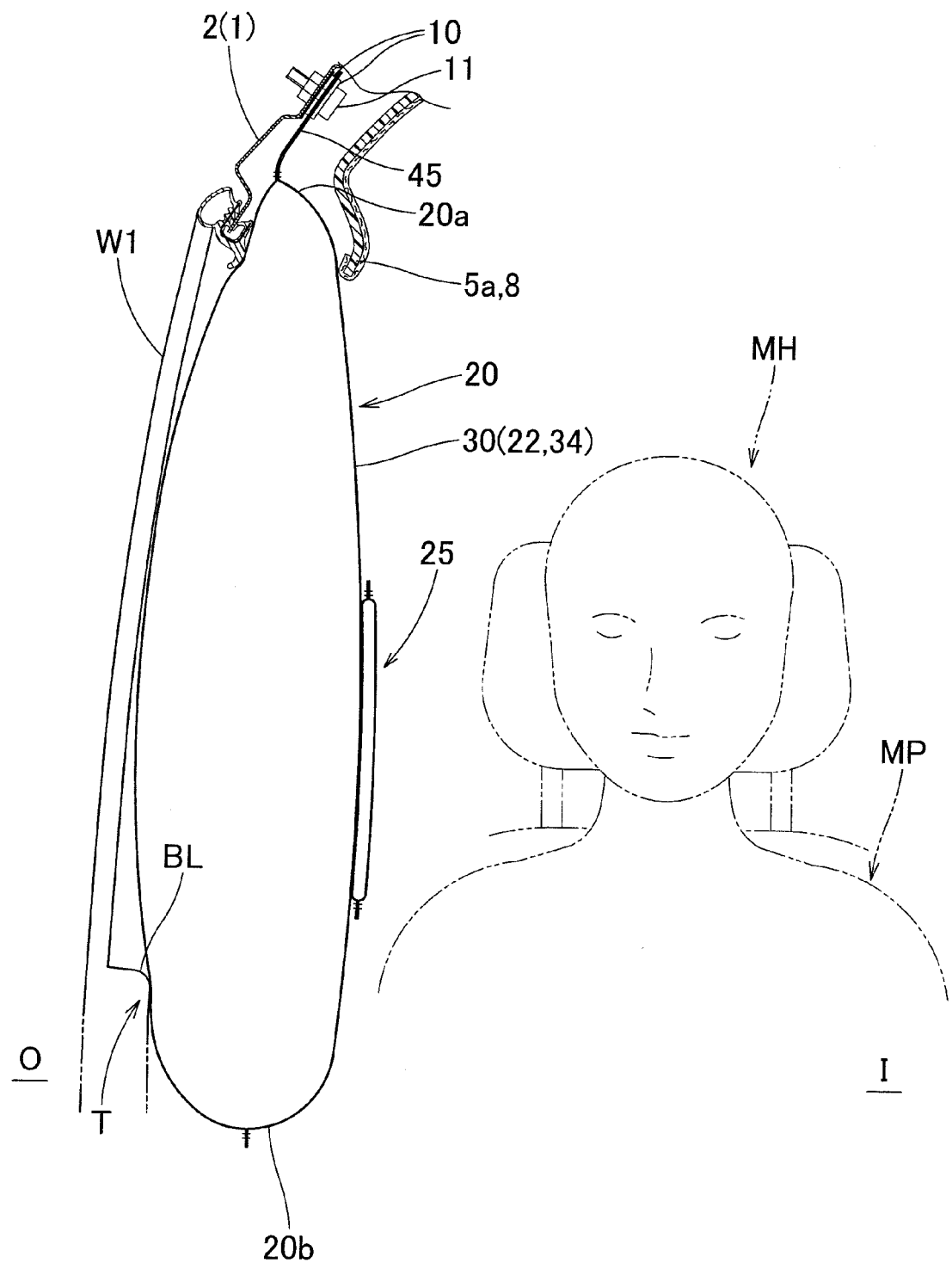
FIG. 6 is a schematic section of the airbag device taken along a left and right direction (i.e., in an in- and outboard direction), showing an inflatable curtain portion inflated at a side impact.
Figure 7:
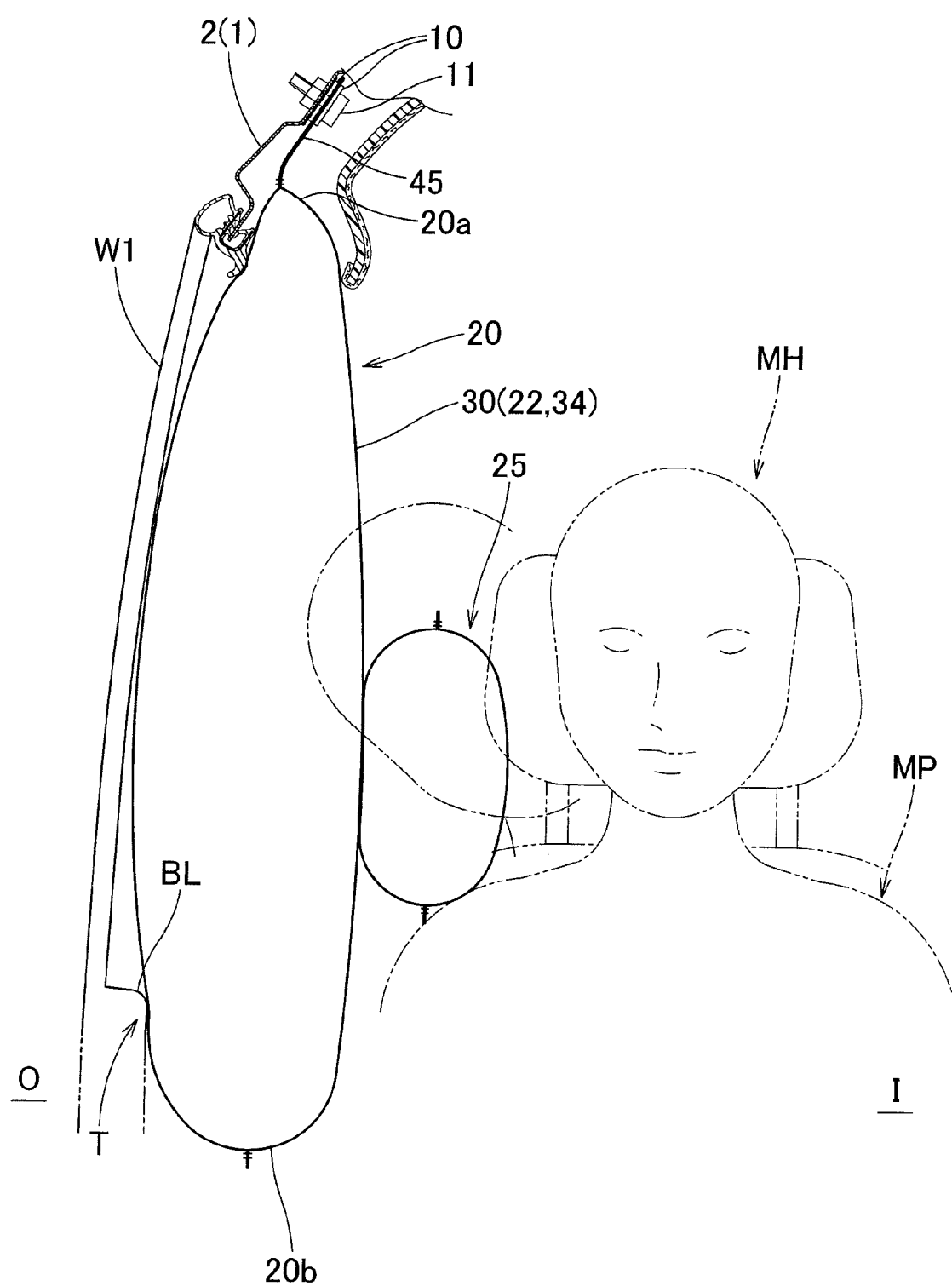
FIG. 7 is a schematic section of the airbag device taken along a left and right direction, showing an overlap inflatable portion inflated after the inflatable curtain portion.

Mounting brackets 10 are used to mount the airbag 19 on the inner panel 2. Each of the mounting brackets 10 is comprised of a pair of plates of metal, which are applied to inboard and outboard sides of each later-described mounting portions 45 of the airbag 19, as shown in FIGS. 6 and 7. Mounting bolts 11 secure the mounting brackets 10, together with the mounting portions 45, to the inner panel 2.

Figure 3:
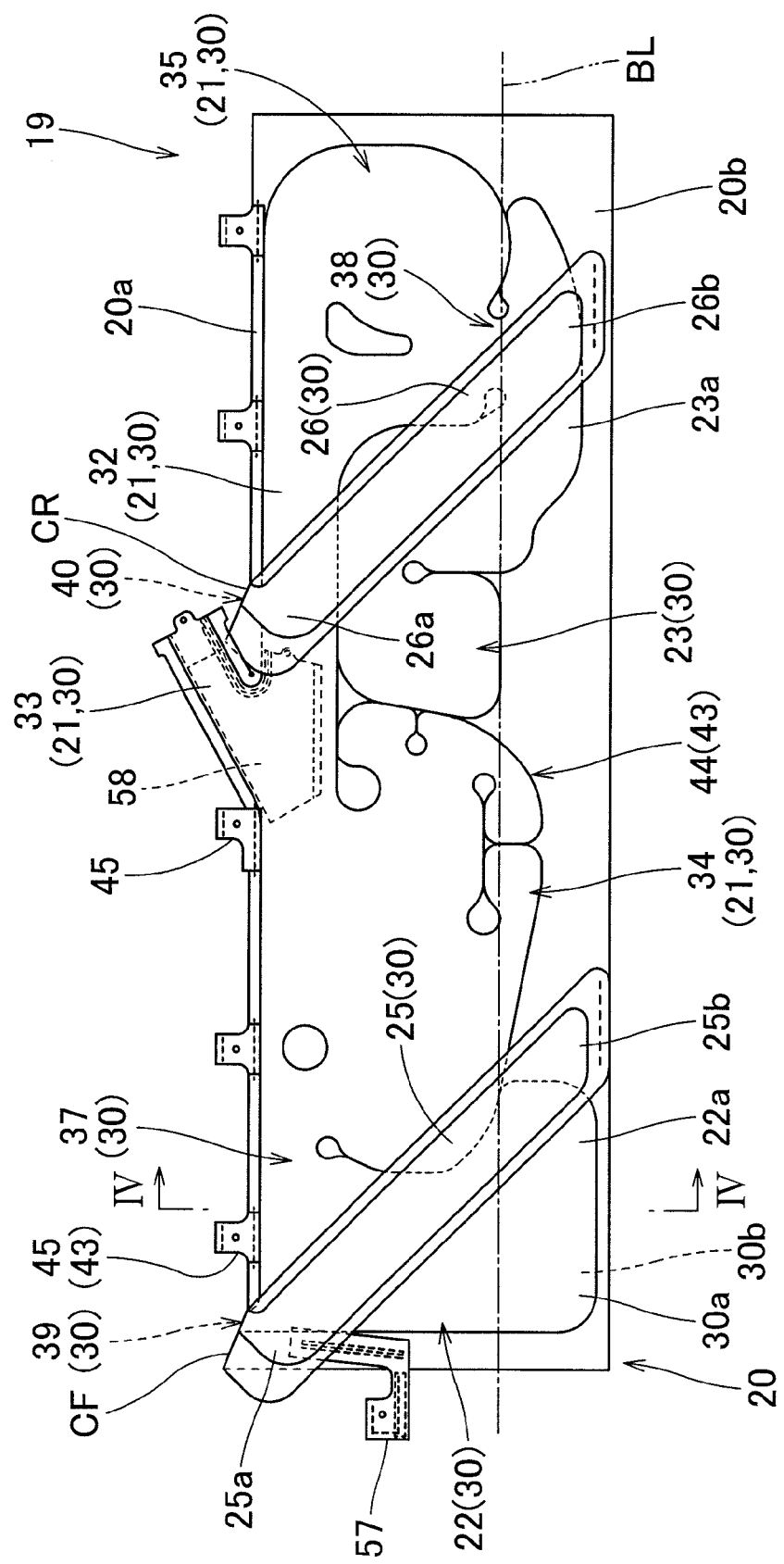
FIG. 3 is a front view of the airbag formed by turning down overlap inflatable portions in the airbag constituting body of FIG. 2, as flattened.
Figure 5:
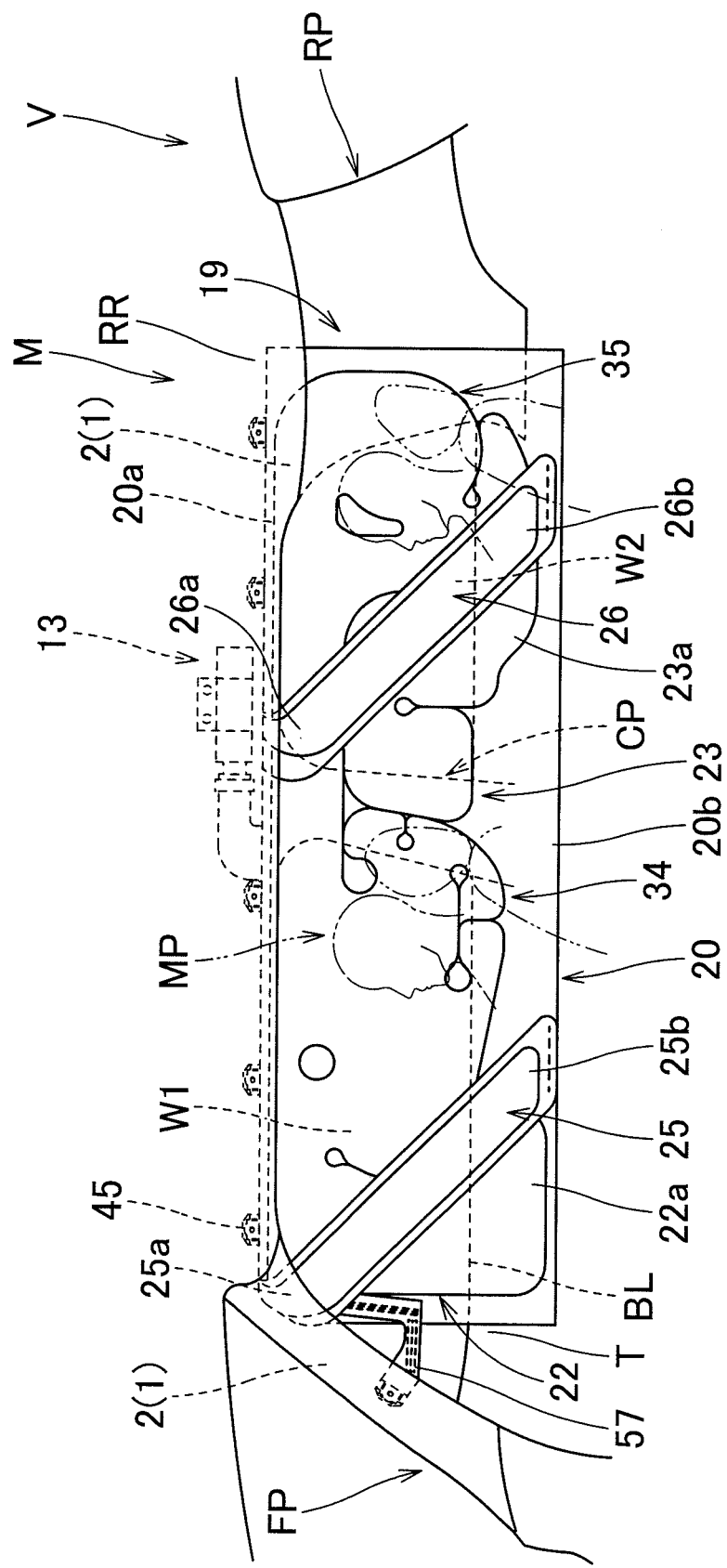
FIG. 5 is a schematic front view of the airbag device as the airbag has been deployed, viewed from an inboard side.

As shown in FIGS. 1 and 5, the airbag 19 is unfoldable and inflatable with an inflation gas fed by the inflator 13 for deployment over the inboard sides I of the windows W1, W2, pillar garnishes 6 and 7 arranged on the center pillar CP and rear pillar RP. As shown in FIG. 3, the airbag 19 includes an inflatable curtain portion 20 deployable over the windows W1 and W2, and two overlap inflatable portions located on an inboard side of the inflatable curtain portion 20 at deployment; a front overlap inflatable portion 25 and a rear overlap inflatable portion 26. The inflatable curtain portion 20 is inflatable into a generally rectangular plate shape lengthy in a front and rear direction such that it covers the window W1, center pillar CP, window W2 and up to the front region of the rear pillar RP (FIG. 5). As shown in FIGS. 3 and 5, the inflatable curtain portion 20 is so designed in dimension in an up and down direction that the lower end region 20b at deployment is located below the beltline BL of the doors, i.e., below the lower edges of the windows W1 and W2.

In the illustrated embodiment, the inflatable curtain portion 20 includes a primary inflatable portion or a main inflatable portion 21 inflatable with an inflation gas fed from the inflator 13 and a secondary inflatable portion that is in gas communication with the main inflatable portion 21 and completes inflation after the main inflatable portion 21 has completed inflation. The secondary inflatable portion is comprised of a front sub inflatable portion 22 and a rear sub inflatable portion 23. The front overlap inflatable portion 25 and the rear overlap inflatable portion 26 are designed to inflate after the main inflatable portion 21 (i.e., the primary inflatable portion), front sub inflatable portion 22 and rear sub inflatable portion 23 (i.e., the secondary inflatable portion), as a tertiary inflatable portion. The inflatable curtain portion 20 of this embodiment is designed to admit inflation gas and inflate generally entirely except at small regions of later-described partitioning joints 47, 48, 49, 50 and thickness regulating portions 51, 52, 53 and 54.

Figure 2:
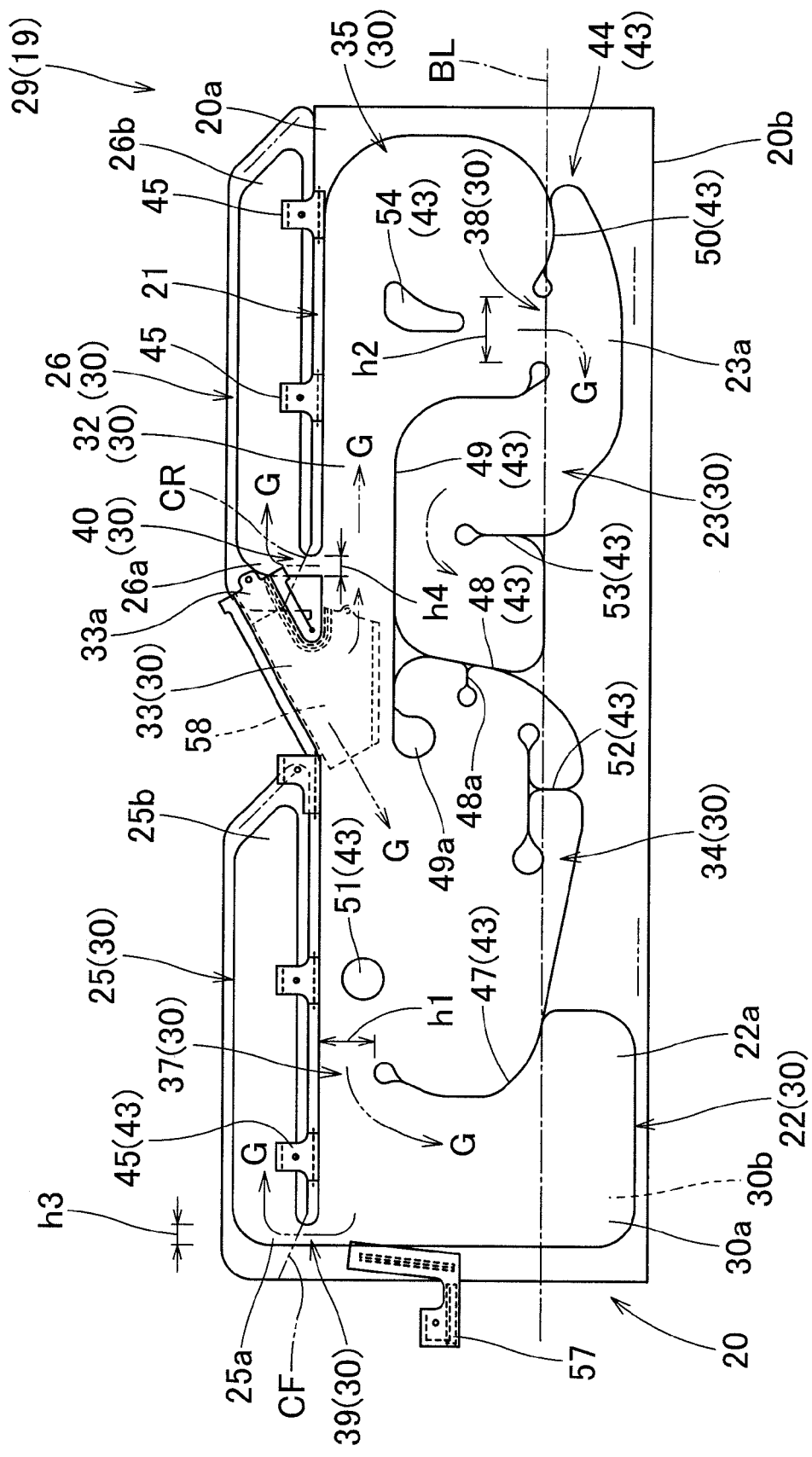
FIG. 2 is a front view of an airbag constituting body for forming an airbag for use in the airbag device of FIG. 1, in a flattened and unfolded state.
Figure 4:
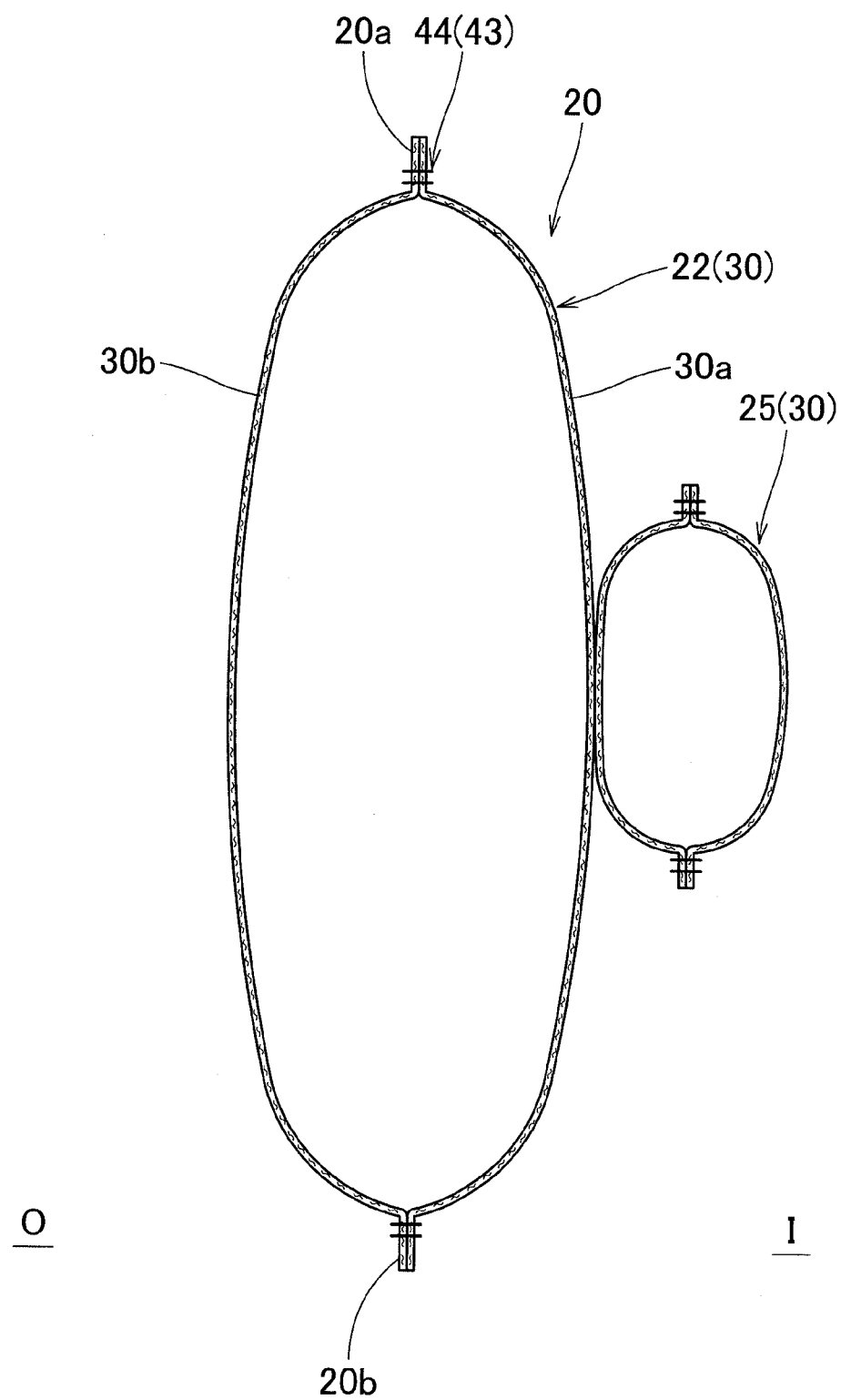
FIG. 4 is a schematic section of the airbag of FIG. 3 as inflated by itself, taken along line IV-IV of FIG. 3.

As shown in FIG. 2, the airbag 19 is formed of an airbag constituting body 29, in which, in a flattened and unfolded state, the front overlap inflatable portion 25 and the rear overlap inflatable portion 26 adjoin at an upper side of the inflatable curtain portion 20 in such a manner as to extend in a front and rear direction. More specifically, the airbag constituting body 29 is generally rectangular in contour when flattened and unfolded, and the front overlap inflatable portion 25 and the rear overlap inflatable portion 26 are respectively located on the front and rear of the connection port 33 which protrudes upward from the center in a front and rear direction of the upper edge 20a of the inflatable curtain portion 20. The connection port 33 is a part of the main inflatable portion 21 of the inflatable curtain portion 20. The front overlap inflatable portion 25 and the rear overlap inflatable portion 26 are inflatable into a generally rod, respectively. The front overlap inflatable portion 25 is in gas communication with the inflatable curtain portion 20 by the front end 25a via a lower reach communication portion 39 whereas the rear overlap inflatable portion 26 is in gas communication with the inflatable curtain portion 20 by the front end 26a via a communication portion 40. The front overlap inflatable portion 25 and the rear overlap inflatable portion 26 are turned down at the lower reach communication portion 39 and communication portion 40, respectively, and jointed (or sewn) to the lower edge 20b of the inflatable curtain portion 20 by the rear ends (or distal ends) 25b and 26b as shown in FIG. 3, such that the front overlap inflatable portion 25 and the rear overlap inflatable portion 26 lap over a gas admissive region (i.e., inflatable region) 30 on an inboard side I of the inflatable curtain portion 20 as shown in FIG. 4.

The airbag constituting body 29 of the illustrated embodiment is made of a pair of cloths sewn together with sewing threads. The cloths are comprised of a fabric woven of polyamide yarn, polyester yarn or the like and coated with a coating agent for preventing gas leakage. As shown in FIGS. 2 to 4, the airbag 19, i.e., the airbag constituting body 29, includes a gas admissive portion 30 which admits an inflation gas G to inflate and a non-admissive portion 43 which admits no inflation gas. When an inflation gas G is introduced, the gas admissive portion 30 inflates in such a manner that an inboard side wall 30a deployable on an inboard side I and an outboard side wall 30b deployable on an outboard side O are separated from each other.

The gas admissive portion 30 includes a gas feed path 32, a connection port 33, a front seat protection portion 34 and a rear seat protection portion 35, a front sub inflatable portion 22, a rear sub inflatable portion 23, a front overlap inflatable portion 25, a rear overlap inflatable portion 26, an upper reach communication portion 37 which provides communication between the main inflatable portion 21 and front sub inflatable portion 22, an upper reach communication portion 38 which provides communication between the main inflatable portion 21 and rear sub inflatable portion 23, a lower reach communication portion 39 which provides communication between the front sub inflatable portion 22 and front overlap inflatable portion 25, and a communication portion 40 which provides communication between the gas feed path 32 and the rear overlap inflatable portion 26. Out of these, the gas feed path 32, the connection port 33, the front seat protection portion 34 and the rear seat protection portion 35 constitute the main inflatable portion 21 of the inflatable curtain portion 20. As shown in FIGS. 3 and 5, when the airbag device M is mounted on a vehicle V, the front overlap inflatable portion 25 and rear overlap inflatable portion 26 have been turned down and are located on the inboard side I of the inflatable curtain portion 20. Accordingly, walls of the front overlap inflatable portion 25 and rear overlap inflatable portion 26 continuing from the inboard side wall 30a of the inflatable curtain portion 20 are located on an outboard side when the airbag 19 is deployed.

The gas feed path 32 extends in a front and rear direction of the inflatable curtain portion 20 along an upper edge 20a of the inflatable curtain portion 20, and is arranged over an entire area in a front and rear direction of the main inflatable portion 21. The gas feed path 32 serves to guide an inflation gas G discharged from the inflator 13 into the front seat protection portion 34 and rear seat protection portion 35 located below the gas feed path 32. At a position slightly forward relative to the center in a front and rear direction of the gas feed path 32 (in other words, generally at the center in a front and rear direction of the inflatable curtain portion 20) is a connection port 33 connected with the inflator 13. The connection port 33 projects upward from the gas feed path 32 in an up- and rearwardly slanted fashion, and is in gas communication with the gas feed path 32. The connection port 33 is open at the rear end 33a. The inflator 13 is inserted therein and fastened with a clamp 16, thus the connection port 33 and the inflator 13 are connected. In the illustrated embodiment, a separate inner tube 58 is located at a region from the connection port 33 to an area of the gas feed path 32 right below the connection port 33 for enhancing heat resistance, as shown in FIGS. 2 and 3.

The front seat protection portion 34 is deployable at a side of the front seat for protecting the head of an occupant seated in the front seat in the event of a side impact. A part of the front seat protection portion 34 extends up to below the beltline BL at airbag deployment. The rear seat protection portion 35 is deployable at a side of the rear seat for protecting the head of an occupant seated in the rear seat in the event of a side impact. The front seat protection portion 34 and rear seat protection portion 35 are so designed as to complete deployment at the point of about 20 to 30 ms after actuation of the inflator 13 due to detection of a side impact of the vehicle V.

The front sub inflatable portion 22 is located right in front of the main inflatable portion 21 (the front seat protection portion 34). The front sub inflatable portion 22 extends up to below the beltline BL at airbag deployment, and its lower end region 22a is located downward relative to the front seat protection portion 34, as shown in FIGS. 2, 3 and 5. The lower end region 22a also extends up to below the front region of the front seat protection portion 34. The front sub inflatable portion 22 is gas communication with the gas feed path 32 of the main inflatable portion 21 via the upper reach communication portion 37 located at the rear upper end, and is so designed as to start admitting an inflation gas G later than the front seat protection portion 34 due to a small opening width (opening area) h1, see FIG. 2, of the upper reach communication portion 37. More specifically, the opening width (opening area) h1 of the upper reach communication portion 37 is so designed that the front sub inflatable portion 22 completes inflation in a time period between 70 to 80 ms after start of actuation of the inflator 13.

The rear sub inflatable portion 23 is arranged to adjoin the main inflatable portion 21. Specifically, the rear sub inflatable portion 23 fills up an area between the front seat protection portion 34 and rear seat protection portion 35 of the main inflatable portion 21, below the gas feed path 32, and includes a region, i.e., the lower end region 23a, extending up to below the rear seat protection portion 35. The lower end region 23a is located downward relative to the beltline BL at airbag deployment. The rear sub inflatable portion 23 is gas communication with the rear seat protection portion 35 of the main inflatable portion 21 via the upper reach communication portion 38 located at the bottom of the rear seat protection portion 35. In a similar fashion to the upper reach communication portion 37 described above, the upper reach communication portion 38 has a small width (opening area, see FIG. 2) h2 such that the rear sub inflatable portion 23 completes inflation in a time period between 70 to 80 ms after start of actuation of the inflator 13, i.e., later than the rear seat protection portion 35. In this specific embodiment, the opening width h2 of the upper reach communication portion 38 is slightly greater than that of the upper reach communication portion 37, because the upper reach communication portion 38 is located at the bottom of the rear seat protection portion 35 and therefore it is harder for an inflation gas G to go through the upper reach communication portion 38 directly compared with the upper reach communication 37 which is located in front of the gas feed path 32.

As shown in FIG. 2, the front overlap inflatable portion 25 and the rear overlap inflatable portion 26 have generally the same width, and the length of each of them is slightly shorter than a length in a front and rear direction of a region of the inflatable curtain portion 20 in front of the connection port 33 or a length in a front and rear direction of a region of the inflatable curtain portion 20 at the rear of the connection port 33.

In the airbag constituting body 29, the front overlap inflatable portion 25 is arranged along the upper edge 20a of the inflatable curtain portion 20, generally along a front and rear direction. The front end 25a of the front overlap inflatable portion 25 is generally in line with the front end of the front sub inflatable portion 22 and the rear end 25b is located proximate to the connection port 33. The front overlap inflatable portion 25 communicates with the front sub inflatable portion 22 via the lower reach communication portion 39 located at the front end 25a. The opening area of the lower reach communication portion 39 is smaller than the upper reach communication portion 37 connecting the front sub inflatable portion 22 and gas feed path 32 such that the front overlap inflatable portion 25 begins to admit an inflation gas G later than the front sub inflatable portion 22. Specifically, the opening width h3 (FIG. 2) of the lower reach communication portion 39 as the airbag constituting body 29 is flattened and unfolded is about ¼ of the opening width h1 of the upper reach communication portion 37. More specifically, the opening width h3 is so designed that the front overlap inflatable portion 25 completes inflation in about 1,500 ms after start of actuation of the inflator 13. The front overlap inflatable portion 25 is connected with the inflatable curtain portion 20 only at a vicinity of the front end 25a in a periphery of the lower reach communication portion 39, and a remaining region is separated from the inflatable curtain portion 20. The front overlap inflatable portion 25 is turned down over an inboard side I of the inflatable curtain portion 20 on a crease CF (FIGS. 2 and 3) extending along a front and rear direction in such a manner as to close off the lower reach communication portion 39, and the rear end (or distal end) 25b is sewn and jointed to the lower edge 20b of the inflatable curtain portion 20 at a location below the front seat protection portion 34. Thus the front overlap inflatable portion 25 is inflatable into a generally rod shape extending down- and rearward (i.e., at a slant relative to an up and down direction) to overlap with the front sub inflatable portion 22 on the inboard side I, in a region covering the window W1 (FIGS. 3 and 5).

In the airbag constituting body 29, the rear overlap inflatable portion 26 is arranged along the upper edge 20a of the inflatable curtain portion 20, generally along a front and rear direction. The front end 26a of the rear overlap inflatable portion 26 is located proximate to the connection port 33 and the rear end 26b is generally in line with the rear end of the inflatable curtain portion 20. The rear overlap inflatable portion 26 communicates with the gas feed path 32 via the communication portion 40 located at the front end 26a. Although the communication portion 40 is directly connected with the gas feed path 32 (i.e., the main inflatable portion 20), its opening width (or opening area) is smaller than the upper reach communication portion 38 that connects the rear sub inflatable portion 23 and rear seat protection portion 35. Specifically, the opening width h4 (FIG. 2) of the communication portion 40 as the airbag constituting body 29 is flattened and unfolded is generally equal to the opening width h3 of the lower reach communication portion 39 for the front overlap inflatable portion 25. This configuration will enable the rear overlap inflatable portion 26 to start to admit an inflation gas G later than the rear sub inflatable portion 23, though the rear overlap inflatable portion 26 is directly connected with the main inflatable portion 21. More specifically, in a similar fashion to the front overlap inflatable portion 25, the rear overlap inflatable portion 26 is designed to complete inflation in about 1,500 ms after start of actuation of the inflator 13. The rear overlap inflatable portion 26 is also connected with the inflatable curtain portion 20 only at a vicinity of the front end 26a in a periphery of the communication portion 40, and a remaining region is separated from the inflatable curtain portion 20. The rear overlap inflatable portion 26 is turned down over an inboard side I of the inflatable curtain portion 20 on a crease CR (FIGS. 2 and 3) extending along a front and rear direction in such a manner as to close off the communication portion 40, and the rear end (or distal end) 26b is sewn and jointed to the lower edge 20b of the inflatable curtain portion 20 at a location below the rear end region of the rear seat protection portion 35. Thus the rear overlap inflatable portion 26 is inflatable into a generally rod shape extending downand rearward (i.e., at a slant relative to an up and down direction) and overlaps with a region from the gas feed path 32 to the rear sub inflatable portion 23 on the inboard side I, in a region covering the window W2 (FIGS. 3 and 5).

The non-admissive portion 43 includes a peripheral portion 44 defining the periphery of the gas admissive portion 30, mounting portions 45 which are used to mount the airbag 19 on the inner panel 2, partitioning joints 47, 48, 49 and 50 arranged within an area of the gas admissive portion 30 and thickness regulating portions 51, 52, 53 and 54 arranged likewise within the area of the gas admissive portion 30. Each of the peripheral portion 44, partitioning joints 47, 48, 49 and 50 and thickness regulating portions 51, 52, 53 and 54 is comprised of a seam that sew the inboard side wall 30a and outboard side wall 30b with sewing threads. Although not clearly shown in the drawings, a sealing agent is applied to overall these seams for preventing gas leakage.

The peripheral portion 44 is so provided as to enclose the gas admissive portion 30 except the rear end 33a of the connection port 33. The mounting portions 45 serve to mount the upper edge 20a of the inflatable curtain portion 20 on the inner panel 2, which is part of a vehicle body structure 1, and are provided in plurality (five, in the illustrated embodiment) along a front and rear direction. Each of the mounting portions 45 is provided with a mounting hole (reference numeral omitted) for receiving the mounting bolt 11. In the illustrated embodiment, each of the mounting portions 45 is formed by stitching a separate material, made of a woven fabric of polyamide yarns, polyester yarns or the like, to the upper edge 20a of the inflatable curtain portion 20.

The partitioning joint 47 is generally in the form of a rod extending upward while curving from a bottom region of the peripheral portion 44 and partitions the front sub inflatable portion 22 and front seat protection portion 34. The leading end of the partitioning joint 47 is located above the later-described partitioning joint 49. The partitioning joint 48 is generally in the form of a rod extending upward from a bottom region of the peripheral portion 44 and partitions the front seat protection portion 34 and rear sub inflatable portion 23. The partitioning joint 48 includes proximate to the center in an up and down direction a branch 48a extending forward in such a manner as to go into an area of the front seat protection portion 34. The branch 48a serves to regulate the thickness of the front seat protection portion 34. The partitioning joint 49 is formed into a generally reverse L that extends forward and rearward from the top of the partitioning joint 48 with the rear end further extended downward. The partitioning joint 49 defines the lower edge of the gas feed path 32 and partitions the rear sub inflatable portion 23 from the gas feed path 32 and rear seat protection portion 35. At the front end of the partitioning joint 49 is a round partitioning joint 49a, which is generally round in shape, for regulating the thickness of the front seat protection portion 34. The partitioning joint 50 extends forward from a rear lower portion of the peripheral portion 44 and partitions the rear seat protection portion 35 from a rear end region of the rear sub inflatable portion 23. In the illustrated embodiment, a clearance between the partitioning joint 47 and an upper edge of the peripheral portion 44 constitutes the upper reach communication portion 37 and a clearance between the partitioning joints 49 and 50 constitutes the upper reach communication portion 38.

The thickness regulating portion 51 is generally round in contour and is located proximate to the front end of the gas feed path 32 and at the rear of the upper reach communication portion 37. The thickness regulating portion 51 prevents too much gas from flowing toward the upper reach communication portion 37 (i.e., into the front sub inflatable portion 22) and prevents a front upper region of the front seat protection portion 34, which is integral with the gas feed path 32, from getting too thick, at inflation of the main inflatable portion 21. The thickness regulating portion 52 is located in a lower edge area of the front seat protection portion 34, which is deployable below the beltline BL of a vehicle V. The thickness regulating portion 52 is formed into a generally flat T protruding upward from a bottom region of the peripheral portion 44. The thickness regulating portion 53 is located inside the rear sub inflatable portion 23 and is formed into a generally rod protruding upward from a bottom region of the peripheral portion 44. The thickness regulating portion 53 partitions the rear sub inflatable portion 23 into front and rear under the gas feed path 32. The thickness regulating portion 54 is located inside the rear seat protection portion 35, immediately above the upper reach communication portion 38. The thickness regulating portion 54 is formed into a flat generally reverse V, and its upper end is located above the partitioning joint 48.

Referring to FIGS. 2 and 3, the airbag 19 of the illustrated embodiment further includes at the front edge of the inflatable curtain portion 20 a connecting belt 57 which is provided separated from the airbag constituting body 29. The connecting belt 57 is made of a fabric woven of polyamide yarn, polyester yarn or the like, similarly to the airbag constituting body 29. The belt 57 is sewn, by the root end, to the front edge of the inflatable curtain portion 20 at a position slightly upward from the center in an up and down direction, thus protruding forward. The leading end of the connecting belt 57 is provided with an insert hole (reference numeral omitted) for receiving a mounting bolt 11 so as to be secured to the inner panel 2 of the vehicle body structure with the bolt 11 and mounting bracket 10, in a similar fashion to the mounting portions 45.

Mounting of the head-protecting airbag device M on a vehicle V is now described. Firstly, the airbag constituting body 29 is provided in a flattened state with the mounting portions 45 and connecting belt 57 sewn thereto in advance. The front overlap inflatable portion 25 and rear overlap inflatable portion 26 are folded on the creases CF and CR toward the inboard side, respectively, and the rear ends (distal ends) 25b and 26b are sewn to the lower edge 20b of the inflatable curtain portion 20. Here, the airbag constituting body 29 is flattened again with the front and rear overlap inflatable portions 25 and 26 overlapped with the inboard side of the inflatable curtain portion 20. Subsequently, the inflatable curtain portion 20 is folded up together with the front and rear overlap inflatable portions 25 and 26 and reduced in size in an up and down direction, by bringing the lower edge 20b close to the upper edge 20a. Then a breakable wrapping member (not shown) is wrapped around the airbag 19 at predetermined positions for keeping the folded-up configuration. Thereafter, the mounting brackets 10 are attached to the mounting portions 45 and the leading end of the connecting belt 57. The connection port 33 and inflator 13 are interconnected with a clamp 16, and the mounting bracket 14 is mounted around the inflator 13. Thus an airbag module is provided.

Thereafter, the mounting brackets 10 and 14 are located at predetermined positions of the inner panel 2 and fixed thereto with the bolts 11 and 15. Then, an unillustrated lead wire extending from a suitable control for actuating the inflator is connected to the inflator 13. If then the front pillar garnish 4, the roof head liner 5, which constitute the airbag cover 8, and further the pillar garnishes 6 and 7 are mounted on the inner panel 2, the head-protecting airbag device M is mounted on the vehicle V.

After the airbag device M is mounted on the vehicle V, when the inflator 13 is actuated in response to an actuating signal fed from the control in the event of a side impact or a rollover of the vehicle V, an inflation gas G discharged from the inflator 13 flows into the inflatable curtain portion 20 of the airbag 19, and the inflatable curtain portion 20 then breaks the wrapping member, pushes and opens the airbag cover 8 constructed of the lower hems 4a and 5a of the front pillar garnish 4 and roof head liner 5, and deploys downward and covers inboard sides of the windows W1, W2, the center pillar CP, and the rear pillar RP, as shown in FIG. 1 (double-dotted lines) and FIG. 5.

With the head-protecting airbag device M, the main inflatable portion 21 of the inflatable curtain portion 20 inflates firstly with an inflation gas as the primary inflatable portion, then the front sub inflatable portion 22 and rear sub inflatable portion 23 follow as the secondary inflatable portion. Then the front overlap inflatable portion 25 and rear overlap inflatable portion 26 inflate after the front and rear sub inflatable portions 22 and 23, as the tertiary inflatable portion.

In the head-protecting airbag device M, the front overlap inflatable portion 25 and rear overlap inflatable portion 26 are deployable on an inboard side I of the inflatable curtain portion 20 in an overlapping fashion. The front and rear overlap inflatable portions 25 and 26 as inflated are in the form of a generally rod shape extending at a slant relative to an up and down direction, respectively, and the front end 25a/26a is connected to the upper edge 20a of the inflatable curtain portion 20 whereas the rear end 25b/26b to the lower edge 20b of the inflatable curtain portion 20. This configuration will increase the thickness of the airbag 19 effectively without increasing a volume of the airbag 19, since inflated regions (i.e., the gas admissive portion 30) of each of the inflatable curtain portion 20 and front and rear overlap inflatable portions 25 and 26 overlap each other in an in- and outboard direction over a wide range in a front and rear direction and in an up and down direction. Moreover, the front and rear overlap inflatable portions 25 and 26 are so configured as to complete inflation after the inflatable curtain portion 20 has completes inflation. With this configuration, in the event of a side impact where an airbag is required to cushion a vehicle occupant at an early time point, mainly the inflatable curtain portion 20 will cushion the head MH of an occupant MP quickly as shown in FIG. 6, and in the event of a rollover which happens at a later time point compared with a side impact, mainly the front overlap inflatable portion 25 and/or rear overlap inflatable portion 26 will cushion the head MH of an occupant MP, as shown in FIG. 7. That is, the head-protecting airbag device M is capable of preventing the head MH of an occupant MP from moving far toward an outside O of a vehicle V and arresting the occupant MP inside the vehicle, in the event of a rollover crash.

Therefore, the head-protecting airbag device M is capable of preventing an occupant MP from moving toward an outside O of a vehicle V and arresting the occupant MP inside the vehicle, in the event of a rollover crash.

Especially in the airbag 19, as shown in FIG. 5, the inflatable curtain portion 20 is so configured that the lower edge 20b deploys below the beltline BL of a vehicle V, and that a part of the gas admissive portion 30, i.e., the lower end region of the front seat protection portion 34, the lower end regions 22a and 23a of the front sub inflatable portion 22 and rear sub inflatable region 23a overlap with an inboard side of a door trim T arranged along the lower edges of the windows W1 and W2, which constitute the beltline BL. Moreover, vicinities of the rear ends 25b and 26b of the front and rear overlap inflatable portion 25 and 26, which are deployable on an inboard side I of the inflatable curtain portion 20, also overlap with an inboard side of the door trim T below the beltline BL, as shown in FIG. 5. This way, the lower edge 20b of the inflatable curtain portion 20 and the rear ends 25b and 26b of the front and rear overlap inflatable portion 25 and 26 will be supported at the outboard sides by the door trim T upon a rollover of a vehicle V, thus arresting and protecting a head MH of an occupant MP properly.

Figure 8:
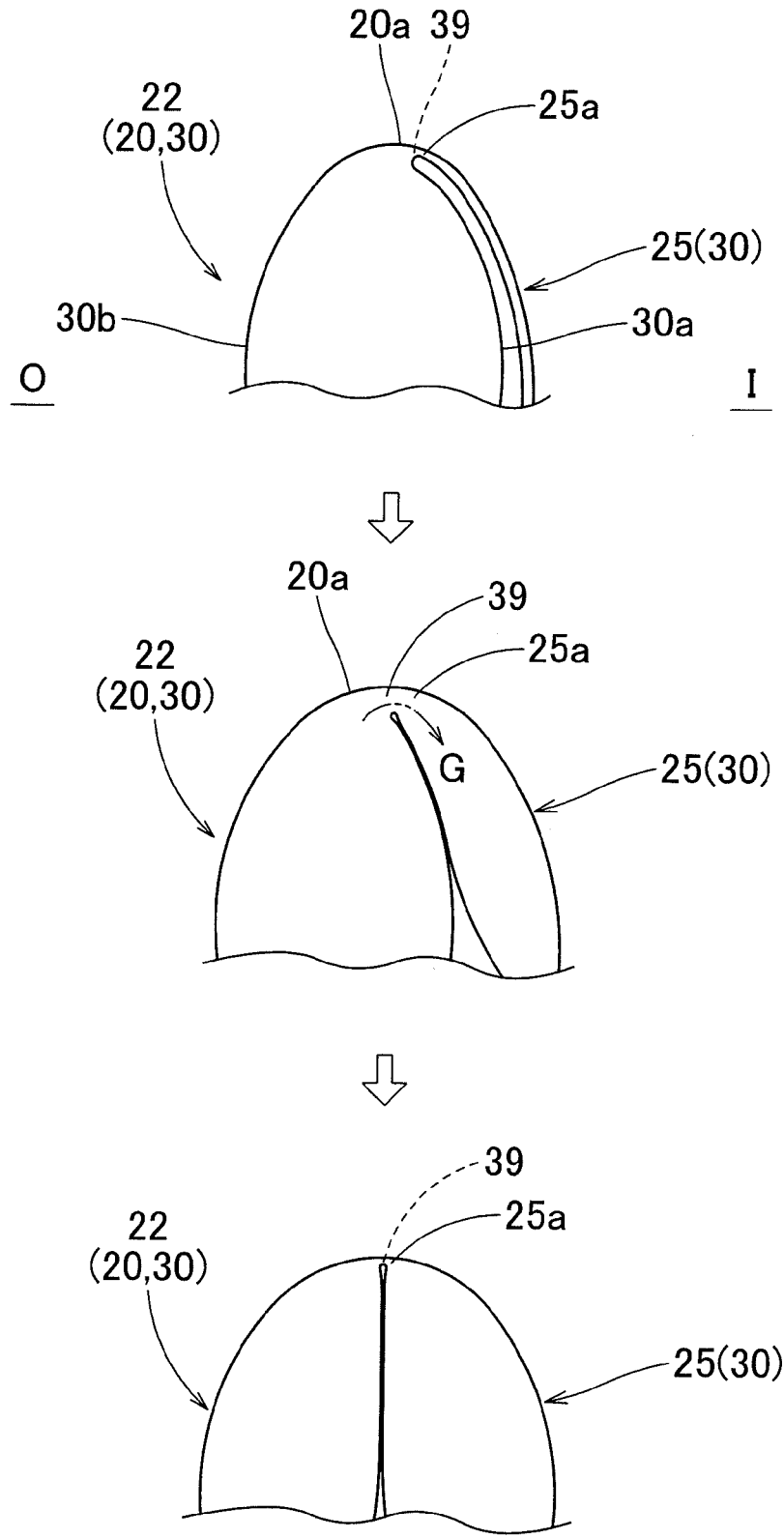
FIG. 8 schematically illustrates a process of inflation of a front overlap inflatable portion.

In the head-protecting airbag device M, moreover, in a flattened and unfolded state of an airbag constituting body 29 for constituting the airbag 19, the front overlap inflatable portion 25 and rear overlap inflatable portion 26 adjoin at an upper side of the inflatable curtain portion 20 and extends generally in a front and rear direction, as shown in FIG. 2. The front overlap inflatable portion 25 and rear overlap inflatable portion 26 communicate with the inflatable curtain portion 20 via the lower reach communication portion 39 and communication portion 40, respectively, provided at the front ends 25a and 26a, and the front and rear overlap inflatable portions 25 and 26 are turned down at the communication portions 39 and 40 over the inboard side of the inflatable curtain portion 20. This configuration will make it difficult for an inflation gas to move through between the inflatable curtain portion 20 and front overlap inflatable portion 25 and between the inflatable curtain portion 20 and the rear overlap inflatable portion 26, and accordingly will delay the start of inflation of the front and rear overlap inflatable portions 25 and 26 surely relative to the start of inflation of the inflatable curtain portion 20. Further, as shown in FIG. 8, since the turned down portion serves as a check valve, an inflation gas having once flown into the front/rear overlap inflatable portion 25/26 will be hindered from moving back to the inflatable curtain portion 20. This will help secure an enough internal pressure of the front/rear overlap inflatable portion 25/26 at a rollover, and the front/rear overlap inflatable portion 25/26 will arrest a head MH of an occupant MP securely even if an internal pressure of the inflatable curtain portion 20 has been reduced.

If such an advantageous effect does not have to be considered, the overlap inflatable portion may be provided separately from the inflatable curtain portion with a communication opening, and be sewn to the inflatable curtain portion by a circumferential edge of the communication opening so as to communicate with the inflatable curtain portion.

Figure 9:
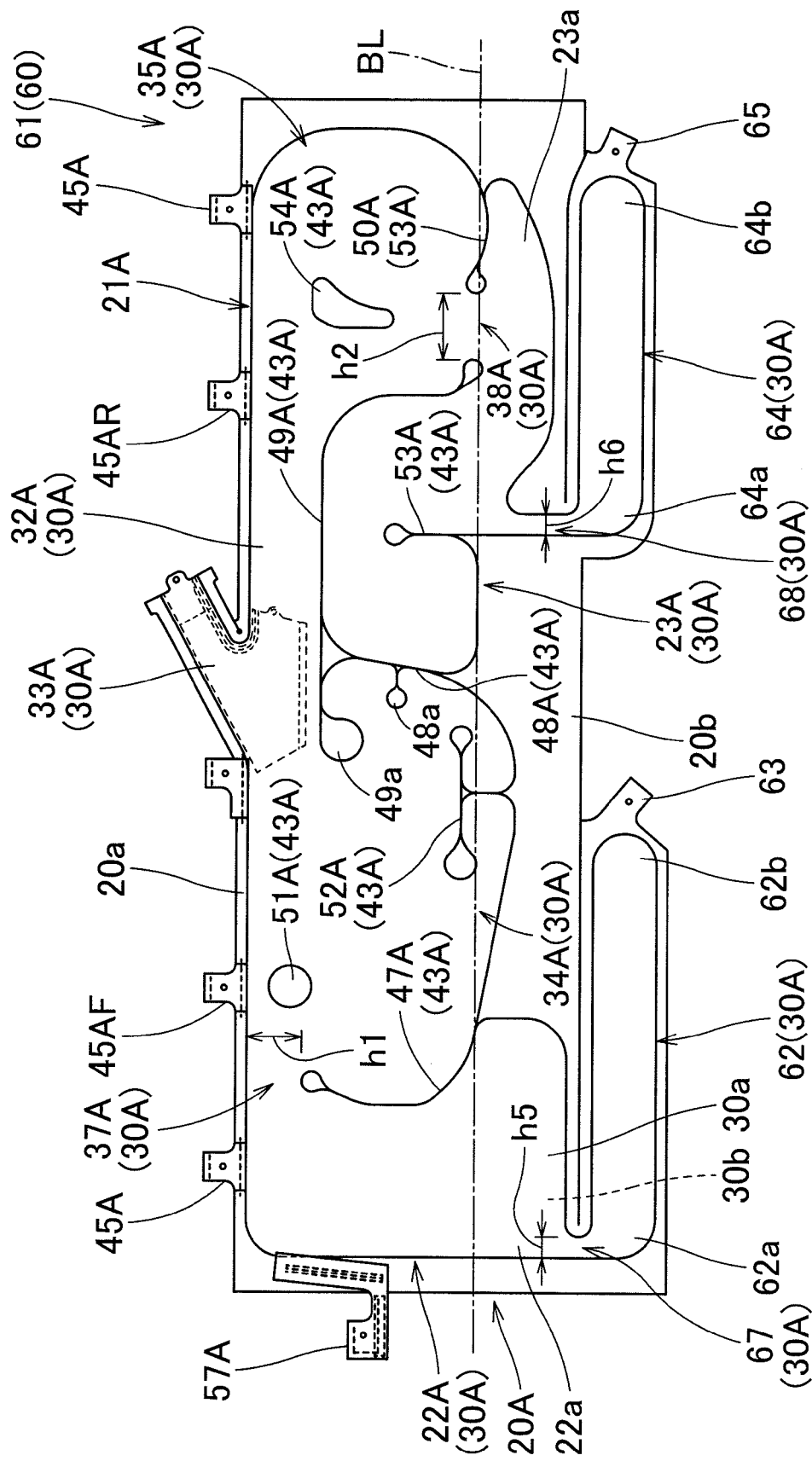
FIG. 9 is a front view of an airbag constituting body for forming an alternative embodiment of the airbag, in a flattened and unfolded state.

In the foregoing embodiment, furthermore, the connection port 33 protruding upward from the center in a front and rear direction of the inflatable curtain portion 20 is integral with the inflatable curtain portion 20, and the front overlap inflatable portion 25 and rear overlap inflatable portion 26 are located in front of and at the rear of the connection port 33 in the airbag constituting body 29 as flattened and unfolded. This configuration will enable the airbag constituting body 29 to be formed into a generally rectangle as shown in FIG. 2 and therefore provide a good yield of a base fabric for forming the airbag constituting body 29 in comparison with an instance where the overlap inflatable portion is located under the inflatable curtain portion. Alternatively, however, as an airbag constituting body 61 shown in FIGS. 9 and 10, a front overlap inflatable portion 62 and a rear overlap inflatable portion 64 may be located under an inflatable curtain portion 20A to form an airbag 60.

Further, in addition to the main inflatable portion 21, the inflatable curtain portion 20 of the foregoing embodiment includes the front sub inflatable portion 22 and rear sub inflatable portion 23 that are in gas communication with the main inflatable portion 21 and completes inflation after the main inflatable portion 21 has completed inflation. These sub inflatable portions 22 and 23 will help suppress an undue increase of internal pressure of the main inflatable portion 21 by absorbing an extra inflation gas from the main inflatable portion 21 when the main inflatable portion 21 cushions a head MH of an occupant MP in the event of a side impact. Accordingly, the front seat protection portion 34 and rear seat protection portion 35 (i.e., the main inflatable portion 21) will cushion the head MH with an adequate reaction force. Moreover, the front overlap inflatable portion 25 is in gas communication with the front sub inflatable portion 22 via the lower reach communication portion 39, and the lower reach communication portion 39 has a smaller opening area (i.e., the opening width h3 as the airbag constituting body 29 is flattened and unfolded) than the upper reach communication portion 37 that provides communication between the front sub inflatable portion 22 and main inflatable portion 21 (or gas feed path 32). This configuration will prevent an inflation gas G having flown into the front sub inflatable portion 22 from immediately flowing into the front overlap inflatable portion 25 in the event of a side impact, and accordingly will delay the start of inflation of the front overlap inflatable portion 25 surely relative to the start of inflation of the front sub inflatable portion 22.

However, if such an advantageous effect does not have to be considered, the overlap inflatable portion may be directly connected with the main inflatable portion, instead of with the sub inflatable portion. Further alternatively, the inflatable curtain portion does not have to include a sub inflatable portion and may be comprised of only the main inflatable portion. In the head-protecting airbag device M of the foregoing embodiment, the rear overlap inflatable portion 26 directly communicates with the gas feed path 32 (i.e., the main inflatable portion 21), not through the rear sub inflatable portion 23. However, since the opening area (the opening width h4) of the communication portion 40 to the gas feed path 32 is smaller than the opening area (the opening width h2) of the upper reach communication portion 38 that provides communication between the rear sub inflatable portion 23 and the rear seat protection portion 35, and is generally equal to the opening area (the opening width h3) of the lower reach communication portion 39. With this configuration, the rear overlap inflatable portion 26 will be prevented from admitting an inflation gas G prior to the rear sub inflatable portion 23, and will inflate generally simultaneously with the front overlap inflatable portion 25.

An alternative embodiment of the invention is now described. An airbag 60 shown in FIG. 10 is formed of an airbag constituting body 61 depicted in FIG. 9. The airbag constituting body 61 has a similar configuration to the airbag constituting body 29 in the foregoing embodiment except in that a front overlap inflatable portion 62 and a rear overlap inflatable portion 64 are located under an inflatable curtain portion 20A. Since the inflatable curtain portion 20A is identical to the inflatable curtain portion 20 of the foregoing embodiment, it will not be described in detail and its members common with the foregoing embodiment will be assigned "A" at the end of common reference numerals. Further, as shown in FIG. 10, the front overlap inflatable portion 62 and the rear overlap inflatable portion 64 of the airbag 60 are located on an outboard side of the inflatable curtain portion 20A.

In the airbag constituting body 61 flattened and unfolded, the front overlap inflatable portion 62 is arranged along the lower edge 20b of the inflatable curtain portion 20A, generally along a front and rear direction. The front end 62a of the front overlap inflatable portion 62 is generally in line with the front end of the front sub inflatable portion 22A and the rear end 62b is located immediate below the thickness regulating portion 52A. The front overlap inflatable portion 62 communicates with the front sub inflatable portion 22A via a lower reach communication portion 67 located at the front end 62a. In a similar fashion to the foregoing embodiment, the opening width h5 (FIG. 9) of the lower reach communication portion 67 as the airbag constituting body 61 is flattened and unfolded is about ¼ of the opening width h1 of the upper reach communication portion 37A such that the front overlap inflatable portion 62 begins to admit an inflation gas G later than the front sub inflatable portion 22A. The front overlap inflatable portion 62 is connected with the inflatable curtain portion 20A only at a vicinity of the front end 62a in a periphery of the lower reach communication portion 67, and a remaining region is separated from the inflatable curtain portion 20A. The front overlap inflatable portion 62 includes at the rear end 62b a mounting flap 63 that is secured to the vehicle body structure with a mounting bracket 10 and bolt 11 together with a mounting portion 45AF located above the thickness regulating portion 51A. The mounting flap 63 is provided with a mounting hole (reference numeral omitted) for receiving the bolt 11. The front overlap inflatable portion 62 is turned down over an outboard side O of the inflatable curtain portion 20A on a crease extending along a front and rear direction in such a manner as to close off the lower reach communication portion 67, and the rear end (distal end) 62b is jointed to the upper edge 20a of the inflatable curtain portion 20A. Specifically, the mounting flap 63 located on the rear end 62b is laid on an outboard side of the mounting portion 45AF of the inflatable curtain portion 20A, and a mounting bracket 10 is mounted thereon from both sides of the mounting flap 63 and mounting portion 45AF and secured to the inner panel 2 with a bolt 11, thus the rear end 62b is jointed to the upper edge 20a of the inflatable curtain portion 20A. The front overlap inflatable portion 62 is inflatable into a generally rod shape extending up- and rearward (i.e., at a slant relative to an up and down direction) on the outboard side O of the inflatable curtain portion 20A and overlaps with a region ranging from the front sub inflatable portion 22A to front end regions of the front seat protection portion 34A and gas feed path 32A (FIG. 10).

The rear overlap inflatable portion 64 is arranged along the lower edge 20b of the inflatable curtain portion 20A, generally along a front and rear direction in the airbag constituting body 61 as flattened and unfolded. The front end 64a of the rear overlap inflatable portion 64 is located immediately below the thickness regulating portion 53A and the rear end 64b is generally in line with the rear end of the inflatable curtain portion 20A. The rear overlap inflatable portion 64 communicates with the rear sub inflatable portion 23A via a lower reach communication portion 68 located at the front end 64a. In a similar fashion to the foregoing embodiment, the opening width h6 (FIG. 9) of the lower reach communication portion 68 as the airbag constituting body 61 is flattened and unfolded is smaller than the opening width h2 of the upper reach communication portion 38A and is generally equal to the opening width h5 of the lower reach communication portion 67 such that the rear overlap inflatable portion 64 begins to admit an inflation gas G later than the rear sub inflatable portion 23A. The rear overlap inflatable portion 64 is connected with the inflatable curtain portion 20A only at a vicinity of the front end 64a in a periphery of the lower reach communication portion 68, and a remaining region is separated from the inflatable curtain portion 20A. In a similar fashion to the front overlap inflatable portion 62, the rear overlap inflatable portion 64 includes at the rear end 64b a mounting flap 65 that is secured to the vehicle body structure together with a mounting portion 45AR located at the rear of the connection port 33A. The rear overlap inflatable portion 64 is turned down over an outboard side O of the inflatable curtain portion 20A on a crease extending along a front and rear direction in such a manner as to close off the lower reach communication portion 68, and the rear end (distal end) 64b is jointed to the upper edge 20a of the inflatable curtain portion 20A by securing the mounting flap 65 to the inner panel 2 with a mounting bracket 10 and bolt 11 together with the mounting portion 45AR. The rear overlap inflatable portion 64 is inflatable into a generally rod shape extending up- and rearward (i.e., at a slant relative to an up and down direction) on the outboard side O of the inflatable curtain portion 20A and overlaps with a region ranging from a lower end region of the rear sub inflatable portion 23A to the gas feed path 32A (FIG. 10).

In the foregoing embodiments, the front overlap inflatable portion 25 and rear overlap inflatable portion 26 of the airbag 19 are arranged at a slant downward and rearward on an inboard side of the inflatable curtain portion 20 whereas the front overlap inflatable portion 62 and rear overlap inflatable portion 64 of the airbag 60 are arranged at a slant upward and rearward on an outboard side of the inflatable curtain portion 20A. However, the location and state of inclination of the overlap inflatable portions should not be limited thereby, but an overlap inflatable portion may also be so arranged at a rear- and upward slant on an inboard side, or at a rear- and downward slant on an outboard side, of the inflatable curtain portion. In terms of arresting a head of an occupant quickly upon a rollover of a vehicle, it will be more preferable to locate an overlap inflatable portion on the inboard side, but in terms of protecting an occupant's head at a side impact, the overlap inflatable portion will be desirably located on the outboard side. Further alternatively, one each overlap inflatable portion may be located on both sides of an inflatable curtain portion so as to intersect with each other as viewed from an in- and outboard direction. Although two overlap inflatable portions are provided in the foregoing embodiments for use for two windows of a vehicle, only one overlap inflatable portion may be provided either on a front side or on a rear side. For a vehicle with three rows of seats, three overlap inflatable portions may be provided. Although the airbags in the foregoing embodiments have been described as having a connection port protruding upward from the center in a front and rear direction of the inflatable curtain portion, the location of the connection port should not be limited thereby. The invention can be applied to an airbag in which a connection port protrudes in a front and rear direction from the front end or rear end of the inflatable curtain portion.

What is claimed is:

1. A head-protecting airbag device having an airbag that is mountable on an upper edge of a window of a vehicle on an inboard side of a vehicle in a folded-up configuration with an upper edge of the airbag secured to a vehicle body structure, the airbag being deployable downward over the window when fed with an inflation gas from an inflator, the airbag comprising:
   an inflatable curtain portion that is deployable over an inboard side of the window; and
   an overlap inflatable portion that is in gas communication with the inflatable curtain portion and is deployable on an inboard side or on an outboard side of the inflatable curtain portion in an inflated state in such a manner as to overlap with an inflated region of the inflatable curtain portion, the overlap inflatable portion being so configured as to complete inflation after the inflatable curtain portion has completed inflation, the overlap inflatable portion being inflatable into a generally rod shape extending at a slant relative to an up and down direction, and a first end of the overlap inflatable portion being in gas communication with the inflatable curtain portion at a vicinity of an upper edge or a lower edge of the inflatable curtain portion as inflated whereas a second end of the overlap inflatable portion being jointed to an opposite edge of the inflatable curtain portion in an up and down direction away from the first end,
   wherein:
   the airbag includes an inboard side wall deployable on the inboard side of the inflatable curtain portion, and an outboard side deployable on the outboard side of the inflatable curtain portion, in the inflated state,
   the inflatable curtain portion includes the inboard side wall and the outboard side wall,
   the overlap inflatable portion includes the inboard side wall and the outboard side wall,
   at airbag deployment, the inboard side wall or the outboard side wall of the inflatable curtain portion, and the inboard side wall or the outboard side watt of the overlap inflatable portion, are arranged in such a manner as to be overlapped.

2. The head-protecting airbag device of claim 1, wherein:
   in a flattened and unfolded state of an airbag constituting body for constituting the airbag, the overlap inflatable portion adjoins at an upper side or at a lower side of the inflatable curtain portion and extends generally in a front and rear direction; and
   the overlap inflatable portion communicates with the inflatable curtain portion via a communication portion provided at a front end or a rear end of the overlap inflatable portion, and the overlap inflatable portion is turned down at the communication portion over the inboard side or outboard side of the inflatable curtain portion.

3. The head-protecting airbag device of claim 2, wherein:
   the airbag includes a connection port that is connected with the inflator for introducing the inflation gas into the inflatable curtain portion, the connection port being integral with the inflatable curtain portion and protruding upward from a center in a front and rear direction of the upper edge of the inflatable curtain portion; and
   the overlap inflatable portion is located at at least either one position in front of or at the rear of the connection port on the inflatable curtain portion in the airbag constituting body as flattened and unfolded.

4. The head-protecting airbag device of claim 1, wherein:
   the inflatable curtain portion includes a main inflatable portion and a sub inflatable portion that is in gas communication with the main inflatable portion via an upper reach communication portion and completes inflation after the main inflatable portion has completed inflation;
   the overlap inflatable portion is in gas communication with the sub inflatable portion via a lower reach communication portion; and
   the lower reach communication portion has a smaller opening area than the upper reach communication portion.

5. The head-protecting airbag device of claim 1, wherein the lower edge of the inflatable curtain portion is deployable below a beltline located at a lower edge of the window.

6. A head-protecting airbag device having an airbag that is mountable on an upper edge of a window of a vehicle on an inboard side of a vehicle in a folded-up configuration with an upper edge of the airbag secured to a vehicle body structure, the airbag being deployable downward over the window when fed with an inflation gas from an inflator, the airbag comprising:

an inflatable curtain portion that is deployable over an inboard side of the window; and an overlap inflatable portion that is in gas communication with the inflatable curtain portion and is deployable on an inboard side or on an outboard side of the inflatable curtain portion in an inflated state in such a manner as to overlap with an inflated region of the inflatable curtain portion, the overlap inflatable portion being so configured as to complete inflation after the inflatable curtain portion has completed inflation, the overlap inflatable portion being inflatable into a generally rod shape extending at a slant relative to an up and down direction, and a first end of the overlap inflatable portion being in gas communication with the inflatable curtain portion at a vicinity of an upper edge or a lower edge of the inflatable curtain portion as inflated whereas a second end of the overlap inflatable portion being jointed to an opposite edge of the inflatable curtain portion in an up and down direction away from the first end, wherein:

in a flattened and unfolded state of an airbag constituting body for constituting the airbag, the overlap inflatable portion adjoins at an upper side or at a lower side of the inflatable curtain portion and extends generally in a front and rear direction; and the overlap inflatable portion communicates with the inflatable curtain portion via a communication portion provided at a front end or a rear end of the overlap inflatable portion, and the overlap inflatable portion is turned down at the communication portion over the inboard side or outboard side of the inflatable curtain portion.

7. The head-protecting airbag device of claim 6, wherein:

the airbag includes a connection port that is connected with the inflator for introducing the inflation gas into the inflatable curtain portion, the connection port being integral with the inflatable curtain portion and protruding upward from a center in a front and rear direction of the upper edge of the inflatable curtain portion; and the overlap inflatable portion is located at at least either one position in front of or at the rear of the connection port on the inflatable curtain portion in the airbag constituting body as flattened and unfolded.

8. The head-protecting airbag device of claim 6, wherein:

the inflatable curtain portion includes a main inflatable portion and a sub inflatable portion that is in gas communication with the main inflatable portion via an upper reach communication portion and completes inflation after the main inflatable portion has completed inflation;

the overlap inflatable portion is in gas communication with the sub inflatable portion via a lower reach communication portion; and the lower reach communication portion has a smaller opening area than the upper reach communication portion.

9. The head-protecting airbag device of claim 6, wherein the lower edge of the inflatable curtain portion is deployable below a beltline located at a lower edge of the window.

10. A head-protecting airbag device having an airbag that is mountable on an upper edge of a window of a vehicle on an inboard side of a vehicle in a folded-up configuration with an upper edge of the airbag secured to a vehicle body structure, the airbag being deployable downward over the window when fed with an inflation gas from an inflator, the airbag comprising:

an inflatable curtain portion that is deployable over an inboard side of the window; and an overlap inflatable portion that is in gas communication with the inflatable curtain portion and is deployable on an inboard side or on an outboard side of the inflatable curtain portion in an inflated state in such a manner as to overlap with an inflated region of the inflatable curtain portion, the overlap inflatable portion being so configured as to complete inflation after the inflatable curtain portion has completed inflation, the overlap inflatable portion being inflatable into a generally rod shape extending at a slant relative to an up and down direction, and a first end of the overlap inflatable portion being in gas communication with the inflatable curtain portion at a vicinity of an upper edge or a lower edge of the inflatable curtain portion as inflated whereas a second end of the overlap inflatable portion being jointed to an opposite edge of the inflatable curtain portion in an up and down direction away from the first end, wherein:

the inflatable curtain portion includes a main inflatable portion and a sub inflatable portion that is in gas communication with the main inflatable portion via an upper reach communication portion and completes inflation after the main inflatable portion has completed inflation;

the overlap inflatable portion is in gas communication with the sub inflatable portion via a lower reach communication portion; and the lower reach communication portion has a smaller opening area than the upper reach communication portion.

11. The head-protecting airbag device of claim 10, wherein the lower edge of the inflatable curtain portion is deployable below a beltline located at a lower edge of the window.

12. The head-protecting airbag device of claim 10, wherein:

in a flattened and unfolded state of an airbag constituting body for constituting the airbag, the overlap inflatable portion adjoins at an upper side or at a lower side of the inflatable curtain portion and extends generally in a front and rear direction; and the overlap inflatable portion communicates with the inflatable curtain portion via a communication portion provided at a front end or a rear end of the overlap inflatable portion, and the overlap inflatable portion is turned down at the communication portion over the inboard side or outboard side of the inflatable curtain portion.

13. The head-protecting airbag device of claim 12, wherein:

the airbag includes a connection port that is connected with the inflator for introducing the inflation gas into the inflatable curtain portion, the connection port being integral with the inflatable curtain portion and protruding upward from a center in a front and rear direction of the upper edge of the inflatable curtain portion; and the overlap inflatable portion is located at at least either one position in front of or at the rear of the connection port on the inflatable curtain portion in the airbag constituting body as flattened and unfolded.

* * * * *